(12) United States Patent
Chen et al.

(10) Patent No.: US 10,454,921 B1
(45) Date of Patent: Oct. 22, 2019

(54) PROTECTION OF AUTHENTICATION CREDENTIALS OF CLOUD SERVICES

(71) Applicants: Yifen Chen, Pasadena, CA (US);
Shen-Nan Huang, Taipei (TW);
Chi-Chang Kung, Taipei (TW)

(72) Inventors: Yifen Chen, Pasadena, CA (US);
Shen-Nan Huang, Taipei (TW);
Chi-Chang Kung, Taipei (TW)

(73) Assignee: TREND MICRO INC., Shibuya-Ku, Tokyo (JP)

( * ) Notice: Subject to any disclaimer, the term of this patent is extended or adjusted under 35 U.S.C. 154(b) by 426 days.

(21) Appl. No.: 14/490,297

(22) Filed: Sep. 18, 2014

(51) Int. Cl.
*H04L 29/06* (2006.01)
*G06F 16/22* (2019.01)

(52) U.S. Cl.
CPC ........... *H04L 63/083* (2013.01); *G06F 16/22* (2019.01); *H04L 63/0428* (2013.01)

(58) Field of Classification Search
CPC ... H04L 63/083; H04L 63/0428; H04L 9/065; G06F 17/30312; G06F 7/06; G06F 15/16; G06F 17/30; G06F 9/45537; G06F 21/57
See application file for complete search history.

(56) References Cited

U.S. PATENT DOCUMENTS

2008/0077809 A1* 3/2008 Hayler ............... G06F 12/1466
713/193
2008/0301057 A1* 12/2008 Oren ...................... G06F 21/31
705/71

* cited by examiner

*Primary Examiner* — Brandon S Hoffman
*Assistant Examiner* — Nega Woldemariam
(74) *Attorney, Agent, or Firm* — Beyer Law Group LLP

(57) ABSTRACT

A proxy server is implemented between a user computer and the Web. The user accesses an IAM service and selects a cloud service. The proxy server intercepts the login form from the user, stores the identifier and password, and replaces the identifier and password. The proxy server allows the form to continue to the IAM service which registers the cloud service. Later, the user accesses the IAM service and selects the cloud service. The IAM service returns a login form for the cloud service with the identifier and password and redirects the user's computer to the cloud service. The proxy server intercepts the form and replaces the identifier and password with the correct identifier and password. The proxy server then allows the form to continue to the cloud service. The user is then authenticated by the cloud service and receives a Web page from the cloud service indicating logged in.

32 Claims, 6 Drawing Sheets

IAM Portal

IAM System Diagram Example

Record in Local Database

Record in Local Database

PROTECTION OF AUTHENTICATION CREDENTIALS OF CLOUD SERVICES

FIELD OF THE INVENTION

The present invention relates generally to protection of passwords and user identifiers used over the Internet. More specifically, the present invention relates to such protection in the context of an Identity and Access Management service.

BACKGROUND OF THE INVENTION

The cloud-based Identity and Access Management (IAM) industry provides software products and services for enterprise and consumer customers to manage their cloud service user accounts. When such an IAM service is employed, a user need only login to the user portal provided by IAM vendors which lists all of the cloud services that the user can access, and he or she can then access any cloud service directly without further authentication.

IAM services do have a clear value proposition: reduce the burden on the user to remember all the many user identifiers and passwords for the various cloud services to which the user subscribes, e.g., Salesforce, Dropbox, Office 365, WebEx, etc. There are two main approaches that IAM vendors utilize in order to provide this value: implementing authentication and authorization protocols; and creating a password manager.

Authentication and authorization protocols such as SAML, OAuth and OpenID Connect are well accepted by larger cloud service providers. For example, Sales Force support both SAML and OpenID Connect based authentication, Microsoft Azure supports SAML, and Amazon Web Services supports OpenID Connect. If several cloud services are configured by a user to trust the same IAM vendor the user only needs to login once to the IAM portal, and then all those cloud services will discover, through protocol exchange, that the user has already been authenticated. In this scenario, there is only one user account managed by the IAM service: the account used to login to the IAM portal. Therefore, the IAM vendor does not manage the user's other credentials (such as a Salesforce account) and there is no privacy concern.

On the other hand, though, the other approach used by IAM vendors does create a privacy concern. This other approach is that an IAM vendor implements a password manager for all the passwords that a user might have for the various cloud services that the user uses. This approach is often needed since many smaller cloud services do not support SAML or other authentication protocols. A password manager helps the user manage all of his or her cloud service accounts centrally. Typically, an IAM portal will prompt a user to enter each user identifier and password once, and then store those identifiers and passwords into a database managed by the IAM vendor. But, storing all of the user's identifiers and passwords by the IAM vendor within its own domain creates privacy and security concerns.

Currently, there is no approach in the market that addresses such concerns. Accordingly, new approaches and systems are desirable that would allow user to take advantage of an IAM service yet would reduce any such privacy and security concerns.

SUMMARY OF THE INVENTION

To achieve the foregoing, and in accordance with the purpose of the present invention, a technique is disclosed that stores sensitive authentication credentials within a domain trusted by a user, while at the same time still enables the user to enjoy the benefits of an IAM service. For example, the user can still enjoy the benefits offered by an IAM service such as a central user portal, access control, reporting, user provisioning, etc., but the security and privacy concerns are greatly reduced. In addition, an entity that provides the proxy gateway service will be able to collaborate with an IAM vendor for mutual benefit.

In a first embodiment, a user registers a desired cloud service with an IAM service in order to access the cloud service at a later time via the IAM service. A proxy gateway server is implemented between the user's computer and the World Wide Web and the user registers with a proxy gateway service which provides the user with an identifier. The user accesses the IAM service over the Internet and selects a cloud service that the user would like to register. After the IAM service prompts for the identifier and password for this cloud service, the login form filled out by the user is intercepted by the proxy gateway service. The proxy service stores the password locally (and optionally stores the user identifier) and replaces the password with a different password that would be unusable by the cloud service to authenticate the user. The proxy service then allows the login form to continue back to the IAM service. The user may then logout of the IAM service or register another cloud service.

In a second embodiment, a user accesses a cloud service via an IAM service. A proxy gateway server is implemented between the user's computer and the World Wide Web and the user registers with a proxy gateway service which provides the user with an identifier. The user accesses the IAM service over the Internet and selects a cloud service that the user would like to access. The IAM service fills out a login form for the selected cloud service with a user identifier and password that the service has stored beforehand and redirects the user's computer to the selected cloud service. The proxy service intercepts the login form and replaces at least the password with the correct password that the proxy service had stored earlier. The proxy service then allows the login form to continue onto the selected cloud service. The user is then authenticated by the cloud service and receives a welcome page from the cloud service indicating that the user has been authenticated.

In a third embodiment, a user registers a selected cloud service with an IAM service and accesses that cloud service in a single session. A proxy gateway server is implemented between the user's computer and the World Wide Web and optionally the user registers with a proxy gateway service which provides the user with an identifier. When the user selects a cloud service from the IAM user portal the portal prompts for a user identifier and password for that cloud service. The login form filled out by the user is intercepted by the proxy service which replaces the password (and optionally the user identifier) with an unusable password. The login form is allowed continue to the IAM service which stores the user identifier and password in association with the selected cloud service. The IAM service then redirects the user's browser with the login form to the cloud service. The proxy service again intercepts the login form and replaces the unusable password with the correct password it has stored earlier. The login form is then allowed to continue on to the selected cloud service. The cloud service authenticates the user and the user is presented with the cloud service splash page indicating that the user has been authenticated and is now logged into the cloud service.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

As mentioned above, an Identity and Access Management (IAM) vendor typically provides a portal over the Internet by which a user may access IAM services in order to log on to any of the user's cloud services quickly and efficiently. Examples of IAM vendors include Centrify and Okta. And, a portal may be provided over the World Wide Web for access using a browser from a typical computer, or, a portal may be provided over a wireless network for access from a mobile device (such as a mobile telephone) by using a software application on the mobile device.

IAM System Example

Figure 1:
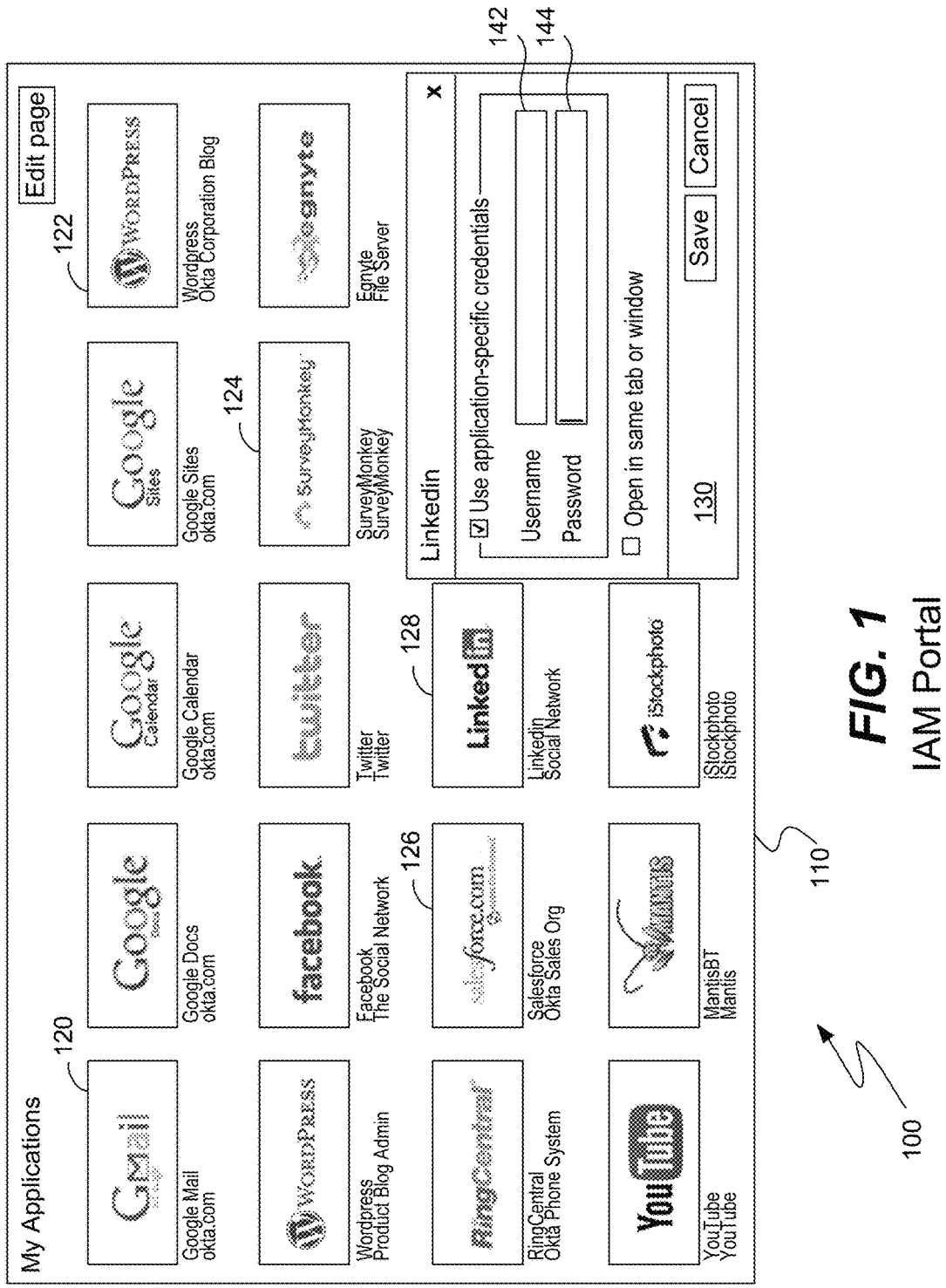
FIG. 1 illustrates an example of an IAM portal that may be presented to a user on a computer or on a mobile device.

FIG. 1 illustrates an example of an IAM portal 100 that may be presented to a user on a computer or on a mobile device. Shown is a window 110 including icons for any number of cloud services that are likely to be used by a typical user. Shown, for example, are the cloud services Gmail 120, WordPress 122, Survey Monkey 124, Salesforce 126 and LinkedIn 128. The cloud services shown may be selected by the IAM vendor or may have been preselected by an administrator of an enterprise. In this example, a user has accessed the IAM portal for the first time and has selected icon 128 which results in window 130 being opened. The IAM portal now prompts for the user name 142 and password 144 for this particular cloud service. Of course, greater or fewer icons of cloud services may be presented and the user may select other cloud services as well.

Figure 2:
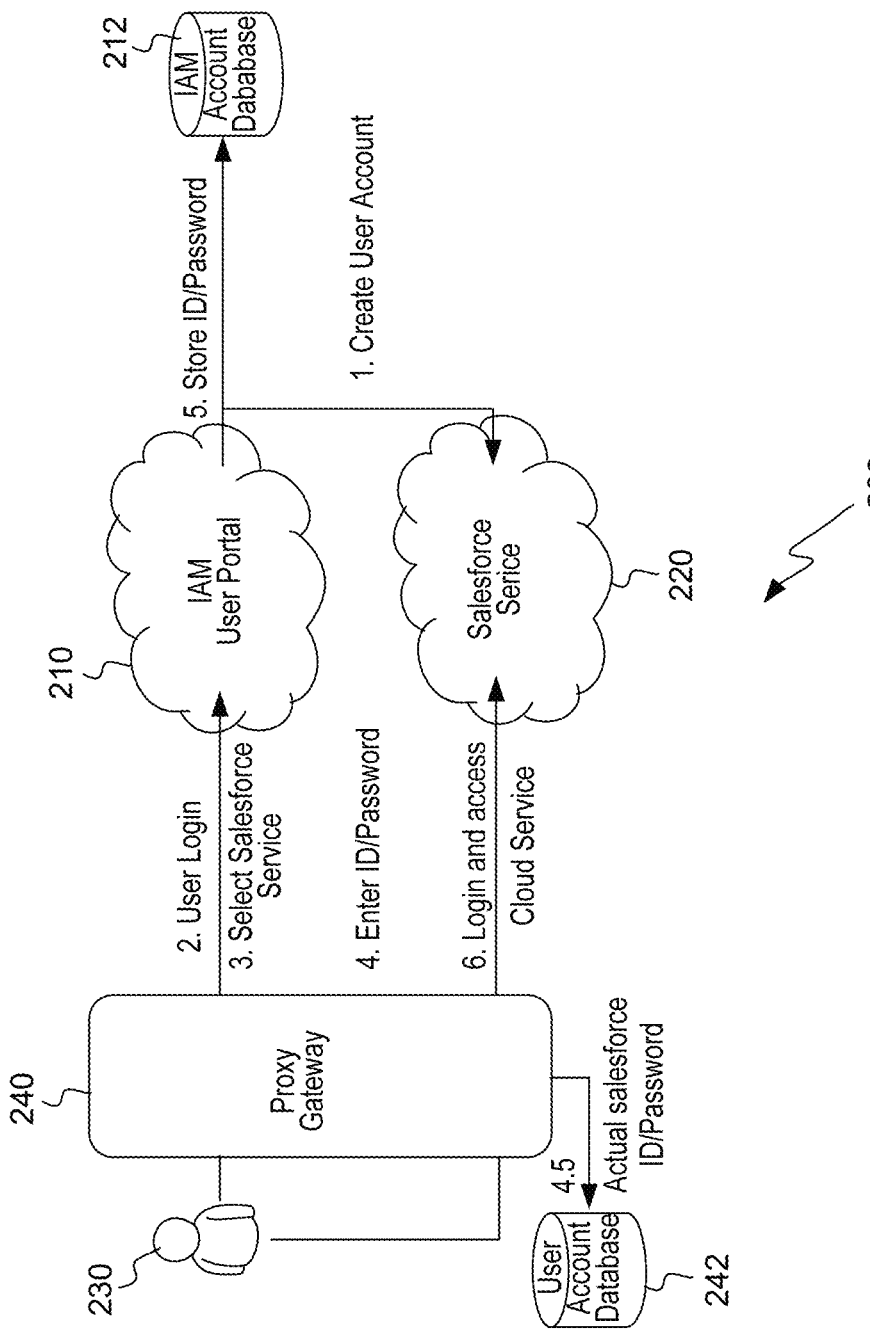
FIG. 2 illustrates an IAM system according to one embodiment of the invention.

FIG. 2 illustrates an IAM system 200 according to one embodiment of the invention. Shown is a user 230 who may access the system using any computing device such as a desktop computer, laptop computer, tablet computer, mobile telephone, etc. User 230 may be an individual consumer who accesses the system from their home or from their own computing device, or may be an employee of an enterprise who accesses the system from their company or from a computing device under control of the company. In the enterprise situation, typically an administrator of the enterprise sets up access to the IAM system and controls which employees may access the system.

IAM User Portal 210 is a Web site accessible over the Internet and is implemented by any suitable IAM vendor, such as those mentioned above. The Web site executes upon a suitable server computer or computers in order to provide an IAM service and the portal may appear as shown in FIG. 1. Associated with this IAM service is an account database 212 implemented in conjunction with the computer server. Also available over the Internet are any of a number of cloud services such as Salesforce service 220, which is a cloud service to which user 230 already subscribes, or is a cloud service to which the user would like to subscribe.

A typical process of using an IAM service includes several steps which will now be described with reference to FIG. 2. In a first step that is not shown, an individual user 230 (i.e., an individual consumer) accesses a cloud service such as service 220 and creates a user account for his or her personal use. Alternatively, in the case of an enterprise in which user 230 is an employee, in step 1 the IAM service creates a user account for the cloud service 220 on behalf of user 230 (and likely other employees). In this alternative situation, the IAM service assists the enterprise in creating user accounts automatically as new employees are hired (for example). In both of these situations, a user identifier and password are established for the user for the particular cloud service 220.

In addition, because the user is interested in using the IAM service, at some point in time the user views the IAM Web site, establishes a user account, and also receives an identifier and password for the IAM service. In step 2, the user logs into the IAM portal 210 using the identifier and password which had previously been established for the IAM service. In step 3, the IAM service presents to the user a list of cloud services which the IAM service supports. For example, a list of cloud services shown at 110 in FIG. 1 may be presented to the user. For an individual, list 110 may be all the cloud services that the IAM service supports. For an employee of an enterprise, list 110 may be a predefined list that an administrator of the enterprise has provided to the IAM service as part of an enterprise access policy. In any case, as part of step 3 the user selects a particular cloud service that he or she would like the IAM service to manage. In step 4, the IAM service detects that this particular cloud service does not support standard SSO protocols and that the user will be required to provide his user identifier and password for this cloud service. For example, FIG. 1 shows at 130 that the user has selected the LinkedIn cloud service and that the user is being prompted to provide his user name and password for this cloud service. Once provided, in step 5 the IAM service stores the user name and password for the LinkedIn cloud service into the IAM database 212. FIG. 2 shows that the user may also select the Salesforce cloud service 220 and provide authentication credentials for that cloud service.

At this point in time, the IAM service is now in possession of the user's secret authentication credentials for at least one cloud service and these credentials are stored in step 5 into account database 212 which is under control of the IAM service. During this session, if the user desires to access the selected cloud service, then in step 6 the IAM service is able to fill in the login form of the selected cloud service on behalf of the user using the authentication credentials from database 212. The user is then able to access the selected cloud service without being required to provide the credentials directly. Alternatively, the user may return to the IAM portal 220 at a later time and access any selected cloud service simply by providing his or her user identifier and password for the IAM service. Of course, all of the user's secret authentication credentials for the cloud services are stored under control of the IAM service in database 212 and there is a potential security risk. Accordingly, the present invention provides a novel approach to protecting the user's authentication credentials involving a proxy gateway and a separate database under control of the user.

Also shown in FIG. 2 is a proxy gateway 240 which is typically a server computer running proxy gateway software. For individual consumers 230 and in many enterprise scenarios, proxy gateway 240 will be "software as a service" (SaaS) offered by a third party to which the user will subscribe. Accordingly, proxy gateway 240 will be located remotely from user 230 and the user will be required to sign up with this service and establish an account. In other enterprise scenarios, the enterprise may purchase the proxy gateway software product and then install it upon its own computer hardware located within its own premises. In either situation, proxy gateway 240 intercepts all Web traffic between the user's computing device and the Internet. Thus, the proxy gateway is able to view all requests from the user's browser of the Internet and is able to view all information sent from Web servers to the user's computing device. Use of proxy servers is known in the art; for example, the browser Internet Explorer includes a special "proxy setting" allowing a user to configure a remote proxy server. Depending upon the user's computing device and his or her browser, the proxy gateway software is responsible for adjusting settings of the user's computer after the user has signed up for this particular service. Linked to proxy gateway 240 is a user account database 242 under control of the user.

In one embodiment, the proxy gateway uses a self-signed SSL certificate in order to intercept SSL traffic. In any case, because the proxy gateway can intercept all Web traffic from the user's computer, the proxy gateway is able to retain the actual identifiers and passwords for the user's cloud services under control of the user while only providing an IAM vendor with unusable identifiers and passwords. These actions above are possible because all user Web traffic is intercepted by the proxy gateway. For example, when the IAM service fills in a login form on behalf of the user, the filled form will go through the proxy gateway as well.

IAM System Flow Diagrams

Generally, when an individual user wishes to access a particular cloud service for the first time and use an IAM vendor to manage the authentication credentials for that cloud service, the user will access the IAM service, provide authentication credentials for the cloud service, and then access the cloud service immediately in order to make use of that cloud service. Alternatively, the user may perform the above in two different sessions. In a first session, the user inputs authentication credentials for a particular cloud service into the IAM service for use at a later time, and then in a later second session the user accesses the IAM service and allows the IAM service to log into the selected cloud service automatically. Although both situations are possible, the below flow diagrams present the second alternative; both flow diagrams may be combined into one session.

As mentioned above with respect to FIG. 2, the proxy gateway computer and software 240 may be offered as "software as a service" and may require that each user (or enterprise) login with a user identifier and password before the proxy gateway may be used in the context of the present invention. Even when the proxy gateway computer is located within an enterprise, the enterprise may still require each user to login. Accordingly, typically a user or company will login to the proxy gateway computer in order to enable the present invention and the proxy gateway will beware of each user's user identifier.

Figure 3:
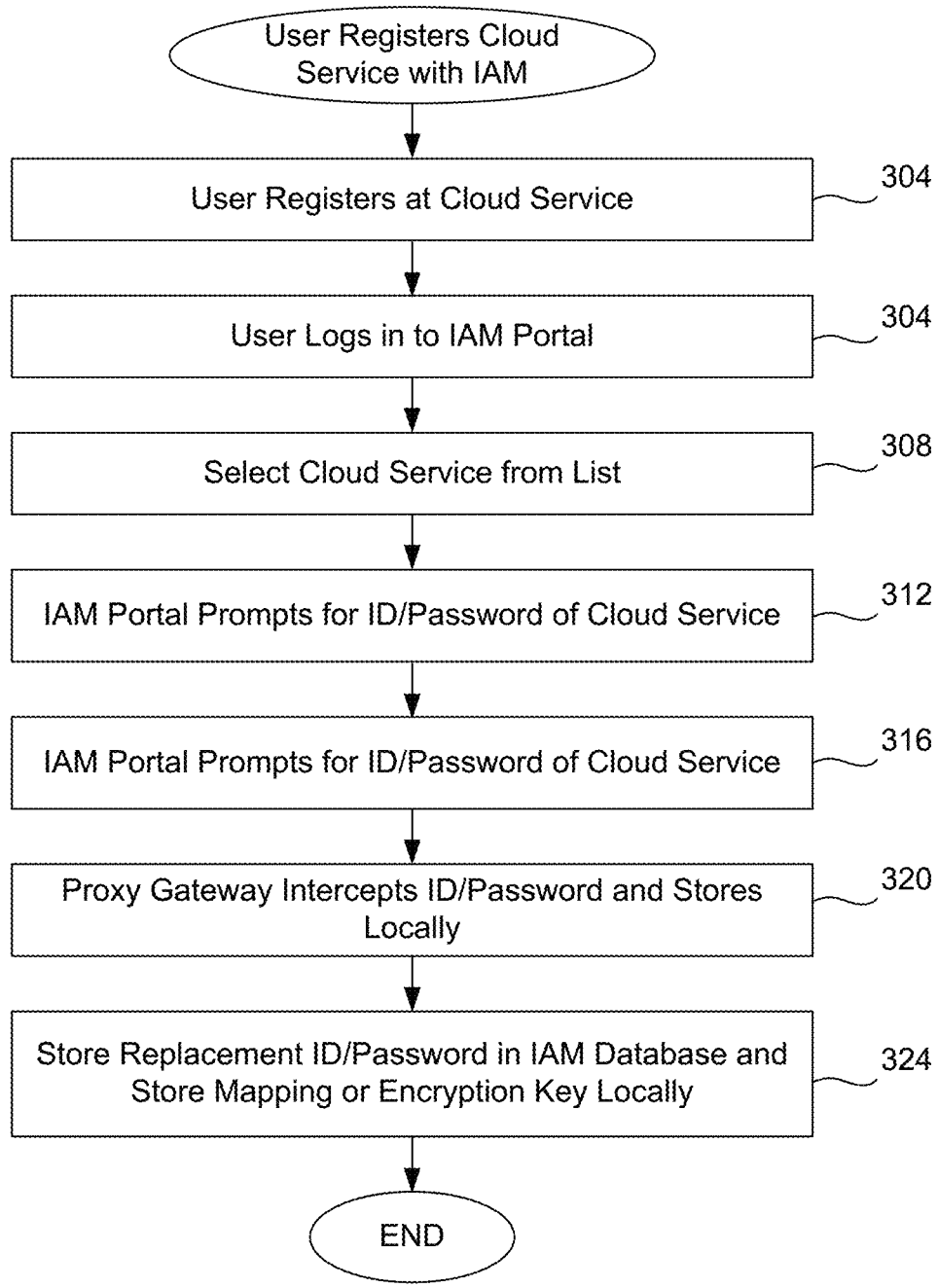
FIG. 3 is a flow diagram describing one embodiment by which a user may register a cloud service with an IAM vendor.

FIG. 3 is a flow diagram describing one embodiment by which a user may register a cloud service with an IAM vendor. In step 304 the user first views a desired cloud service Web site, establishes an account, and receives a user identifier and password for that Web site. In the case of an enterprise, an administrator may provision user accounts for any number of employees at the desired cloud service, for those cloud services that lend themselves to corporate accounts such as Salesforce, for example. Of course, a user may establish an account at any number of desired cloud services. In step 308 the user then views a Web site of an IAM portal and logs into that portal using an established identifier and password or creates an account at the IAM portal at that time. In step 312 the user is presented with a list of available cloud services on the IAM portal, for example, a list such as shown in FIG. 1, and selects one of the cloud services.

In step 316 the IAM portal determines that authentication credentials are needed for the selected cloud service and the portal prompts the user for these credentials. For example, window 130 may be presented which prompts for the user name 142 and password 144 for the desired cloud service LinkedIn. In the case of portal 210 being accessed over the Web from a browser of a computing device, the IAM service sends a login form to the user's computer.

The user then enters his or her authentication credentials for the desired cloud service and clicks "Save" (for example) or indicates in some other fashion that the credentials should be returned to the IAM service. Next, in step 320 proxy gateway 240 intercepts this login form that is being returned to the IAM service and retrieves the true user name and password for the desired cloud service from the form. Because all Web traffic from the user computing device will pass through the proxy gateway computer the proxy gateway software executing upon the computer is able not only to intercept the login form but also able to replace the true authentication credentials with fake credentials.

Various techniques may be used by the proxy gateway service to intercept the login form that is sent to a cloud service for authentication. In one embodiment, the proxy gateway software maintains a list of known URLs to which the login form may be sent; these URLs are recognized as being destinations for login forms used in authentication. For example, Google's URL for authentication is "https://accounts.google.com/ServiceLoginAuth," Facebook's URL is "https://www.facebook.com/login.php," and LinkedIn's URL is "https://www.linkedin.com/uas/login-submit."

When a form passes through the proxy gateway and an authentication URL is recognized the gateway intercepts the form and replaces the credentials as will be explained below. In a second embodiment, heuristics are used to determine if a particular form passing through the proxy gateway contains authentication information. For example, if the form contains the words "identifier," "ID," "e-mail," or "username" along with the word "password" in conjunction with values, then it may be assumed that the form contains authentication information and it will be intercepted and the information replaced. In a third embodiment, an IAM vendor may allow corporate users (typically) to configure login form parameters to include precise parameter names for the authentication information and to include the precise URL. Thus, the proxy gateway software will be on the lookout for these precise names and URLs. For example, parameter names include: "Email," and "Passwd" for Google; "email," and "pass" for Facebook; and "session_key," and "session_password" for Linked.

Once intercepted, the true user identifier and password are extracted from the login form and this authentication information is stored locally in step 4.5 in a user database 242. In the case of an enterprise, database 242 may be any suitable database on a computer within control of the enterprise. In the case of an individual, database 242 may simply be the hard disk of the user's home or office computer. In a separate embodiment, the service provider that provides the proxy gateway server and software 240 (for example, Trend Micro Inc.) may also provide a database in which to store the true user identifier and password. In this separate embodiment an enterprise or individual is not required to maintain their own database with authentication credentials; the enterprise or individual trusts that the service provider will maintain the authentication credentials in confidence. In this separate embodiment the authentication credentials would be stored remotely from any computer of the enterprise or individual.

In step 324 the true login credentials are replaced in the login form with replacement credentials and a means to retrieve the true login credentials is stored locally. Two basic techniques are used to implement steps 320 and 324 (although, other techniques are also acceptable) and rely upon the user having previously logged into the proxy gateway service as mentioned above and having been assigned either a user identifier for the proxy gateway or a company identifier for the proxy gateway.

Using the first technique, the proxy gateway will replace the true credentials in the login form with random strings of numerals, characters or any other suitable symbol (including leaving these fields blank), and then allow these fake credentials to be transmitted to the IAM portal 210 which will then store them in the IAM database 212. Because these are fake credentials, there is no risk having them stored in the cloud not under control of the user. The proxy gateway then stores the following information locally as described above with respect to step 320: proxy gateway user identifier; cloud service identifier (e.g., a URL); cloud service true user identifier; cloud service true user password; and company identifier (for enterprise users). This information will typically be stored together as a record in a database and each field may be used as a key to find individual records. The information will also preferably be encrypted. When the user accesses the particular cloud service in the future, the proxy gateway user identifier and the cloud service identifier can be used to map to the correct cloud service true user identifier and true password.

Using the second technique, instead of replacing the true credentials in the login form, the proxy gateway will encrypt the true credentials within the login form. Or, only the password need be encrypted. The encryption key may then be stored in a local database under control of the user along with the proxy gateway user identifier and company identifier. Preferably, each enterprise or each individual user will have a different encryption key. When the user accesses the particular cloud service in the future, only the proxy gateway user identifier is needed to find the appropriate encryption key. Or, if the proxy gateway only uses a single encryption key for all users, no mapping is needed. Preferably though, multiple encryption keys will be used.

In a variation on the above techniques, it is not necessary that a user login to the proxy gateway to establish a proxy gateway user identifier and password to begin with. This situation is most likely when the proxy gateway computer is located within an enterprise. Under the first technique then, only the user's password for the cloud service is replaced with random characters and the user's true identifier is allowed to be stored in IAM database 212. When the user accesses the particular cloud service in the future, the user's true identifier and the cloud service identifier may be used to map to the local database in order to find the cloud service true password. Under the second technique then, only the user's password for the cloud service is encrypted and the user's true identifier is allowed to be stored in a IAM database 212. When the user accesses the particular cloud service in the future, the user's true identifier may be used to find the appropriate encryption key in the local database corresponding to that user. The encryption key is then used to decrypt the true password. Once the above steps have been completed the user has successfully registered a particular cloud service with an IAM service according to one embodiment of the invention.

Figure 4:
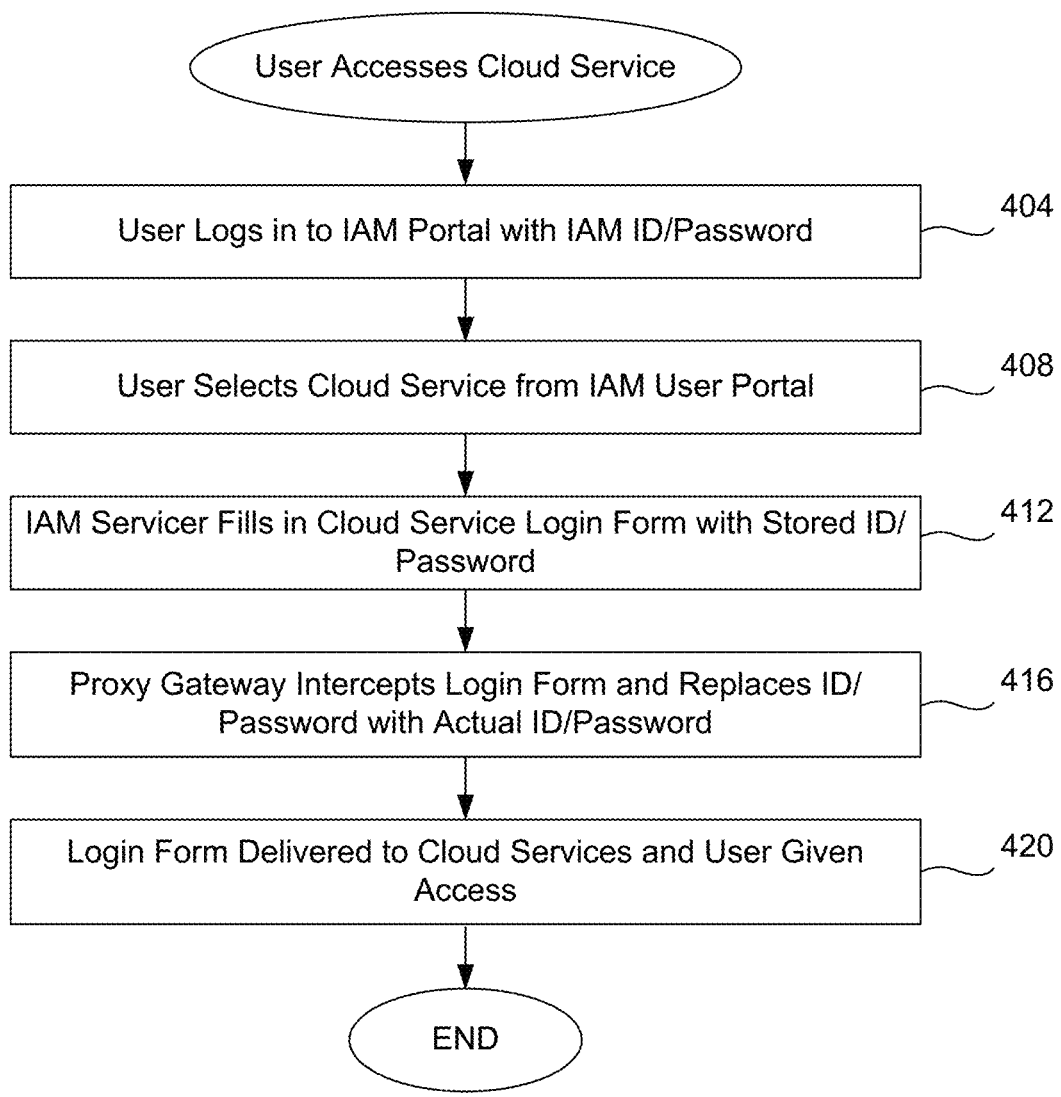
FIG. 4 is a flow diagram describing one embodiment by which the user may access a cloud service using an IAM service.

FIG. 4 is a flow diagram describing one embodiment by which the user may access a cloud service using an IAM service. As mentioned above, typically a user will have already logged in to the proxy gateway service and will have provided their proxy gateway user identifier. In step 404 a user views the IAM portal 210 and logs into the IAM service using their IAM user identifier and password. Next, in step 408 the user is presented with a list or display of available cloud services such as is shown in window 110. Of course, there may be fewer cloud services or more, and window 130 would not be present. The user may be presented with all cloud services that the IAM service supports, or may only be presented with the cloud services that the user has previously registered with the IAM service. The user then selects a particular cloud service that they wish to use (for example, Salesforce 126) by clicking upon or otherwise selecting the cloud service from the display. Note that the user need not enter any identifier or password for that particular cloud service because the identifier and password have been previously stored as explained in FIG. 3.

In step 412 the IAM service retrieves from its database 212 the user's identifier and password for the cloud service Salesforce as it normally would, although in this situation the retrieved identifier and password had been replaced with random characters or had been replaced with an encrypted identifier and password in accordance with step 324. The IAM service then fills in the login form for the selected cloud service with the unusable identifier and password and then redirects the user's browser to the actual cloud service, in this case, "Salesforce.com." Because of the redirection, this Web traffic now passes through the user's browser enabling the proxy gateway to intercept this Web traffic.

Accordingly, in step 416 the proxy gateway service intercepts this login form and replaces the identifier and password with the true identifier and password for the cloud service "Salesforce.com." Depending upon which technique was used above in step 324, the proxy gateway performs this replacement either by using the proxy gateway user identifier and cloud service identifier to find the true cloud service user identifier and password in local storage, or by using the proxy gateway user identifier to find the correct encryption key also in local storage, in order to decrypt the encrypted password in the login form. Once the true identifier and password for the cloud service have been placed into the login form, then in step 420 the redirection with the login form is allowed to continue to the actual cloud service. The cloud service then accepts the login form, authenticates the user, and provides the user access to the cloud service. At this point, what the user sees next (after selecting the cloud service from the IAM user portal in step 408) is the home page of the cloud service, "Salesforce.com," with the user having been authenticated.

Example Database Records

Figure 5A:
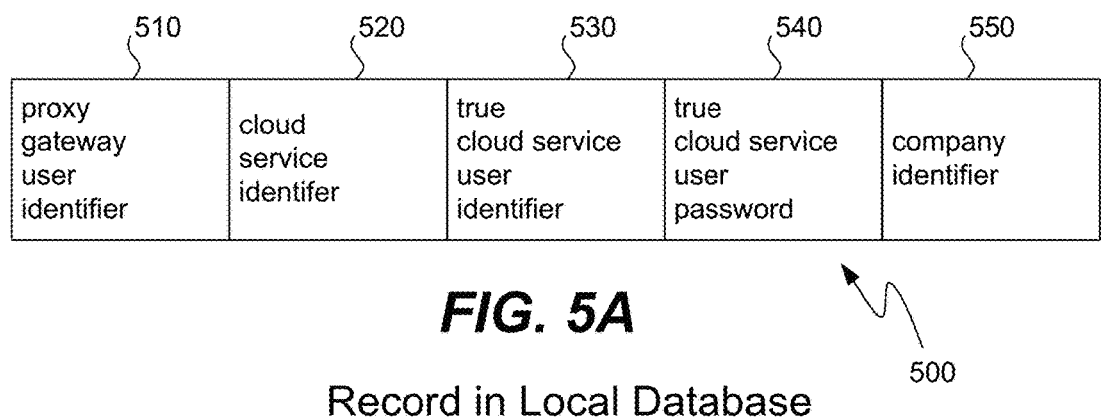
FIGS. 5A and 5B illustrates a record in a local database according to embodiments of the invention.
Figure 5B:
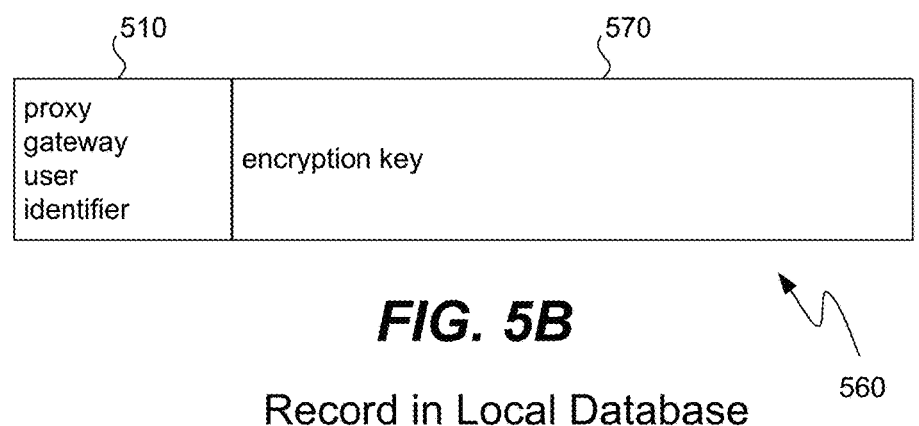

FIGS. 5A and 5B illustrates a record in a local database according to embodiments of the invention. As mentioned above in steps 320 and 324, after the proxy gateway intercepts the login form it stores the true user identifier and password for the selected cloud service locally, or it encrypts the user identifier and password. In either case, a means is provided to retrieve the true user identifier and password in step 416.

FIG. 5A shows an example record in a local database used when the proxy gateway stores the true user identifier and password locally and replaces them with random characters in the login form. Saved into a local database under control of an individual user, an enterprise, or the proxy gateway service is: the proxy gateway user identifier 510 (a unique identifier for each user who logs into use the proxy gateway service); a cloud service identifier 520 (a unique identifier for each cloud service that the IAM service supports); the true cloud service user identifier 530 (the actual identifier used by the user to login to the cloud service); the true cloud service user password 540 (the actual password used by the user to login to the cloud service); and, a company identifier 550 (a unique identifier for each enterprise that makes use of the proxy gateway service). Of course, variations are possible. For example, it is not strictly necessary that the true cloud service user identifier be replaced in the login form with random characters and that it be stored as 530 in the local database. It may only be necessary to replace the user's password with random characters and store the password as 540 in the local database or, a combination of the company identifier 550 and the user identifier 530 may be used to locate the record. And, while the record may be stored locally on an individual user's computer or within an enterprise, the proxy gateway service may also store records under its control.

FIG. 5B shows an example record in a local database used when the proxy gateway encrypts the user identifier and password for a particular cloud service in place in the login form. Saved into a local database under control of an individual user, an enterprise, or the proxy gateway service is: the proxy gateway user identifier 510 (a unique identifier for each user who logs into use the proxy gateway service); and, the encryption key 570 used to encrypt the identifier and password. Of course, variations are possible, such as an additional field for the company identifier. For example, it is not strictly necessary that the true cloud service user identifier be encrypted in the login form; it may only be necessary to encrypt the password. And, while the record may be stored locally on an individual user's computer or within an enterprise, the proxy gateway service may also store records under its control.

Computer System Embodiment

Figure 6A:
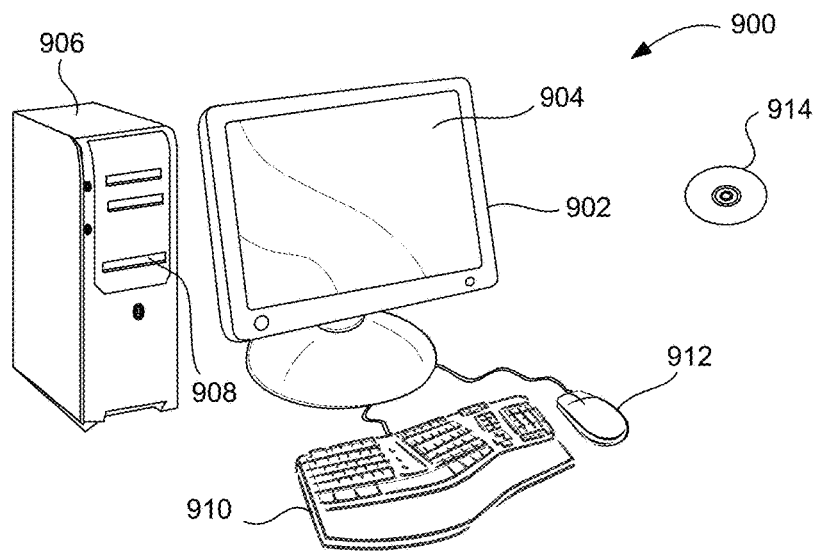
FIGS. 6A and 6B illustrate a computer system suitable for implementing embodiments of the present invention.
Figure 6B:
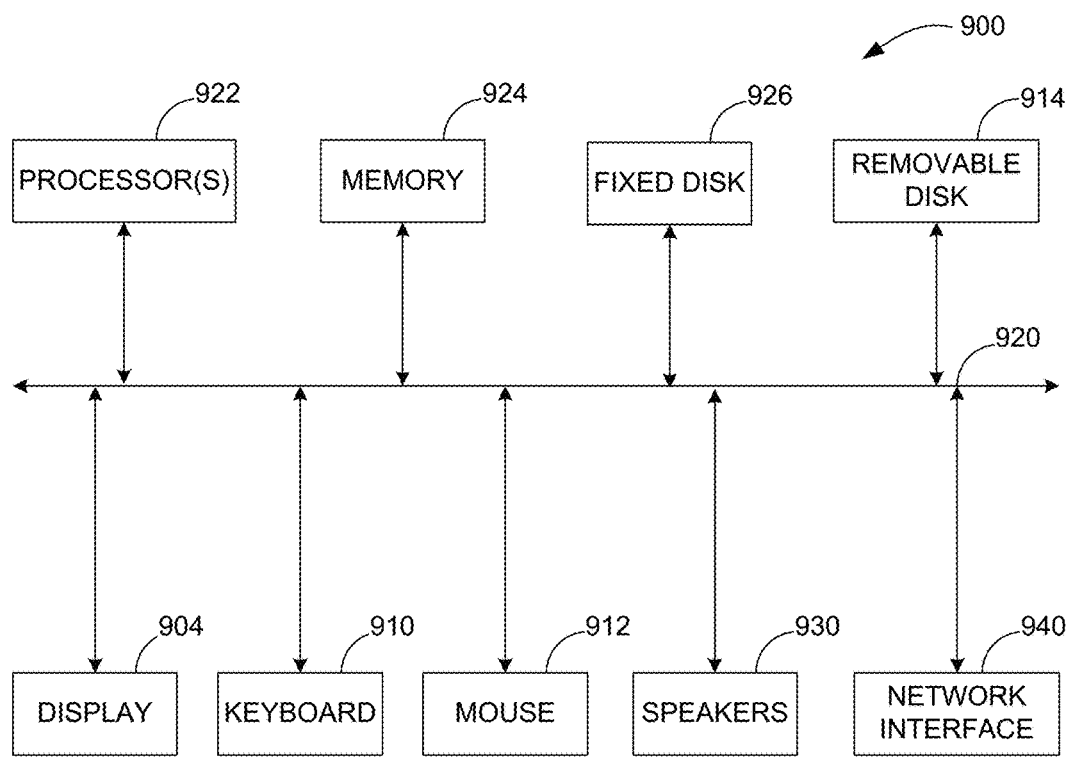

FIGS. 6A and 6B illustrate a computer system 900 suitable for implementing embodiments of the present invention. FIG. 6A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 6B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary mass storage medium (such as a hard disk, a solid-state drive, a hybrid drive, flash memory, etc.) that can be slower than primary storage but persists data. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. In a proxy gateway computer, a method of registering a cloud service with an access management server providing access to a plurality of different cloud services, said method comprising:
passing a first request from a user computer of a user to register a selected cloud service to said access management server;
passing a second request from said access management server to provide authentication credentials to said user computer;
intercepting a response from said user computer that includes a user identifier and a password for said selected cloud service;
storing said password in a database under control of said proxy gateway computer, wherein said password is stored within a domain trusted by said user;
replacing said password in said response with an unusable password that does not provide access to said selected cloud service, said unusable password including a random string of symbols or an encrypted string of symbols; and
allowing said response with said user identifier and said unusable password to continue to said access management server, wherein said access management server does not have access to said password.

2. The method as recited in claim 1 wherein said unusable password includes random characters.

3. The method as recited in claim 1 wherein said unusable password is said password encrypted with an encryption key, said method further comprising:
storing said encryption key in said database under control of said user.

4. The method as recited in claim 1 further comprising:
storing said user identifier in said database under control of said proxy gateway computer; and
replacing said user identifier in said response with an unusable user identifier that does not provide access to said selected cloud service.

5. The method as recited in claim 1 wherein said database is not under control of said access management server.

6. The method as recited in claim 1 wherein said access management server is an identity and access management (IAM) server.

7. The method as recited in claim 1 wherein said database is located on said user computer, is located within an enterprise to which said user computer belongs, or is located on said proxy gateway computer.

8. The method as recited in claim 1 wherein said proxy gateway computer is located within an enterprise that includes said user computer or wherein said proxy gateway computer is located remotely from said user computer over an Internet connection.

9. The method as recited in claim 1, further comprising:
in response to a subsequent access of the selected cloud service, using the user identifier to determine said password stored in said database.

10. The method as recited in claim 1 further comprising:
passing a list of said cloud services to said user computer for display.

11. The method as recited in claim 1 wherein said access management server is located remotely from said user computer, wherein said proxy gateway computer intercepts all Web traffic between said user computer and the Internet, wherein said database is not under control of said access management server, said method further comprising:
passing said first request to said access management server over an Internet connection; and
intercepting said response from said user computer to said access management server.

12. The method as recited in claim 11 wherein said unusable password is said password encrypted with an encryption key, said method further comprising:
storing said encryption key in said database under control of said user.

13. In a proxy gateway computer, a method of accessing a cloud service via an access management server providing access to a plurality of different cloud services, said method comprising:
passing a first request from a user computer of a user to said access management server in order to login to said access management server;
passing a second request from said user computer in order to access a selected cloud service to said access management server;
intercepting a response from said access management server intended for said cloud service that includes a user identifier and a password of said user for said selected cloud service, said password including a random string of symbols or an encrypted string of symbols;
retrieving from a database under control of said proxy gateway computer a correct password that provides access to selected cloud service for said user, wherein said correct password is stored within a domain trusted by said user, and wherein said access management server does not have access to said correct password;
replacing said password in said response with said correct password; and
allowing said response with said user identifier and said correct password to continue to said selected cloud service.

14. The method as recited in claim 13 wherein said password includes random characters and does not provide access to said selected cloud service.

15. The method as recited in claim 13 wherein said password is said correct password encrypted with an encryption key, said method further comprising:
replacing said password with said correct password by decrypting said password with said encryption key.

16. The method as recited in claim 13 further comprising:
retrieving from said database under control of said user a correct user identifier that provides access to said selected cloud service; and
replacing said user identifier in said response with said correct user identifier.

17. The method as recited in claim 13 wherein said database is not under control of said access management server.

18. The method as recited in claim 13 wherein said access management server is an identity and access management (IAM) server.

19. The method as recited in claim 13 wherein said database is located on said user computer, is located within an enterprise to which said user computer belongs, or is located on said proxy gateway computer.

20. The method as recited in claim 13 further comprising:
passing a list of said cloud services to said user computer for display.

21. The method as recited in claim 13 wherein said access management server is located remotely from said user computer, wherein said proxy gateway computer intercepts all Web traffic between said user computer and the Internet, wherein said database is not under control of said access management server, wherein said password intercepted from said access management server is unusable and does not provide access to said selected cloud service, said method further comprising:

passing said first request to said access management server over an Internet connection.

22. The method as recited in claim 21 wherein said password is said correct password encrypted with an encryption key, said method further comprising:

replacing said password with said correct password by decrypting said password with said encryption key.

23. In a proxy gateway computer, a method of accessing a cloud service via an access management server providing access to a plurality of different cloud services, said method comprising:

passing a first request from a user computer of a user to access a selected cloud service to said access management server;

passing a second request from said access management server to provide authentication credentials to said user computer;

intercepting a first response from said user computer that includes a user identifier and a password for said selected cloud service;

storing said password in a database under control of said proxy gateway server, wherein said password is stored within a domain trusted by said user;

replacing said password in said response with an unusable password that does not provide access to said selected cloud service, said unusable password including a random string of symbols or an encrypted string of symbols;

intercepting a second response from said access management server intended for said cloud service that includes a user identifier and said unusable password of said user for said selected cloud service, wherein said access management server does not have access to said password;

replacing said unusable password in said response with said password; and allowing said second response with said user identifier and said password to continue to said selected cloud service.

24. The method as recited in claim 23 wherein said proxy gateway computer is under control of an enterprise that also controls said user computer.

25. The method as recited in claim 23 wherein said proxy gateway computer is located remotely over an Internet connection from said user computer and provides software as a service.

26. The method as recited in claim 23 further comprising:

storing said password in a local database under control of said user before said step of replacing said password.

27. The method as recited in claim 23 further comprising:

passing to said user computer a Web page from said selected cloud service indicating that said user has been authenticated by said selected cloud service.

28. The method as recited in claim 23 wherein said database is located on said user computer, is located within an enterprise to which said user computer belongs, or is located on said proxy gateway computer.

29. The method as recited in claim 23 further comprising:

passing a list of said cloud services to said user computer for display.

30. The method as recited in claim 23 wherein said access management server is located remotely from said user computer, wherein said proxy gateway computer intercepts all Web traffic between said user computer and the Internet, wherein said database is not under control of said access management server, said method further comprising:

passing said first request to said access management server over an Internet connection; and intercepting said first response from said user computer to said access management server.

31. The method as recited in claim 30 wherein said unusable password is said password encrypted with an encryption key, said method further comprising:

storing said encryption key in said database.

32. The method as recited in claim 23 wherein said unusable password is said password encrypted with an encryption key, said method further comprising:

storing said encryption key in said database; and replacing said unusable password in said response with said password by decrypting said unusable password with said encryption key.

* * * * *